US012145768B2

(12) United States Patent
Fulbright

(10) Patent No.: US 12,145,768 B2
(45) Date of Patent: Nov. 19, 2024

(54) NESTABLE BOTTLE

(71) Applicant: University of South Carolina, Columbia, SC (US)

(72) Inventor: Ron Fulbright, Chesnee, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 17/862,546

(22) Filed: Jul. 12, 2022

(65) Prior Publication Data

US 2023/0026154 A1 Jan. 26, 2023

Related U.S. Application Data

(60) Provisional application No. 63/221,541, filed on Jul. 14, 2021.

(51) Int. Cl.

| | |
|---|---|
| ***B65D 43/02*** | (2006.01) |
| ***A61J 1/03*** | (2023.01) |
| ***B65D 21/02*** | (2006.01) |
| ***B65D 51/24*** | (2006.01) |
| ***B65D 53/02*** | (2006.01) |

(52) U.S. Cl.

CPC ............ *B65D 21/0233* (2013.01); *A61J 1/03* (2013.01); *B65D 51/242* (2013.01); *B65D 53/02* (2013.01)

(58) Field of Classification Search

CPC .. B65D 21/0233; B65D 51/242; B65D 53/02; B65D 2543/0092; B65D 2543/00518; B65D 2543/00537; B65D 41/02; B65D 43/022; B65D 43/0222; B65D 39/0023; A61J 1/03

USPC .............. 206/528, 217; 220/4.24, 4.27, 212; 215/10

See application file for complete search history.

(56) References Cited

U.S. PATENT DOCUMENTS

| | | | | |
|---|---|---|---|---|
| 2,047,951 A * | 7/1936 | Eberhart | ............ | B65D 43/0222 220/377 |
| 2,819,813 A * | 1/1958 | Larsen | ............... | B65D 43/0222 220/281 |
| 2018/0311111 A1* | 11/2018 | Knobel | .................. | B65D 50/06 |
| 2019/0315535 A1* | 10/2019 | Karll | .................... | B65D 50/041 |

* cited by examiner

*Primary Examiner* — King M Chu

(74) *Attorney, Agent, or Firm* — Offit Kurman; Douglas L. Lineberry

(57) ABSTRACT

Described herein is an improved bottle and lid design that eliminates the need for lids on bottles that require unscrewing, snapping, or other exertion to remove and/or replace the lid.

8 Claims, 4 Drawing Sheets

NESTABLE BOTTLE

TECHNICAL FIELD

The subject matter disclosed herein is generally directed to an improved bottle and lid design that eliminates the need for lids on bottles that require unscrewing, snapping, or other exertion to remove and/or replace the lid.

BACKGROUND

The pharmaceutical plastic bottle market is a $9.31 billion market, www.businesswire.com. In the United States alone, there are over four billion prescriptions filled many of which require the use of a pill bottle with existing bottles using either screw-on/off caps or Snap-On/off caps. A significant portion of the population has difficulty with or experiences frustration with these caps on a daily basis. Anyone with physical limitations, especially the elderly who might have arthritis, lack of muscle coordination, diminished vision, reduced strength, or other issues, has trouble unscrewing or snapping off a bottle cap. This is a critical problem particularly for medicinal bottles where it is imperative for the person to have easy access to daily medicine.

Accordingly, it is an object of the present disclosure to provide a new kind of bottle, called the "Nestable," that does not require unscrewing or snapping to remove and replace the "lid."

Citation or identification of any document in this application is not an admission that such a document is available as prior art to the present disclosure.

SUMMARY

The above objectives are accomplished according to the present disclosure by providing in one embodiment a nestable bottle. The nestable bottle may include a bottle first portion defining a lid on an outer surface of the first bottle portion, a bottle second portion defining at least one open internal cavity and a bottom of the nestable bottle; the bottle first portion formed such that at least one inner surface of the bottle first portion engages over and slides down at least one outer surface of second bottle portion. Further, contents or medicines may be stored within bottle second portion. Still, the bottle first portion may include at least one frictional engagement feature formed on an outer surface of the lid on the bottle first portion. Again, the nestable bottle may include at least one sealant feature to seal out air and/or moisture. Again still, the at least one sealant feature may be formed on at least one inner surface of the bottle first portion. Still further, the at least one sealant feature may be formed on at least one outer surface of the bottle second portion. Further yet, the at least one sealant feature may be an O-ring, wax seal and/or rubber seat Further again, the bottle first portion may be formed so that when secured over the bottle second portion the bottle first portion does not cover an entirety of bottle second portion outer surface and may leave at least one uncovered grasp zone exposed on bottle second portion outer surface. Moreover, the nestable bottle may have at least one grip aiding feature defined on an outer surface of the lid. Even further still, the nestable bottle may comprise a prescription medicine bottle.

In a further embodiment, the disclosure provides a method for making a nestable bottle. The method may include forming a bottle first portion to define a lid on an outer surface of the first bottle portion, forming a bottle second portion to define at least one open internal cavity and a bottom of the nestable bottle, forming the bottle first portion such that at least one inner surface of the bottle first portion is formed to engage over and slide down at least one outer surface of second bottle portion. Further, the method may include forming the open internal cavity of bottle second portion to contain at least one medicine. Still, the method may include forming the bottle first portion to include at least one frictional engagement feature defined on an outer surface of the lid defined on the bottle first portion. Yet again, the method may include forming the nestable bottle to include at least one sealant feature to seal out air and/or moisture. Further yet, the method may include forming the at least one sealant feature on at least one inner surface of the bottle first portion. Still again, the method may include forming the at least one sealant feature on at least one outer surface of the bottle second portion. Again further, the method may include forming the at least one sealant feature as an O-ring, wax seal and/or rubber seal. Still yet, the method may include forming the bottle first portion so that when secured over the bottle second portion, the bottle first portion does not cover an entirety of bottle second portion outer surface and bottle first portion is formed to leave at least one uncovered grasp zone exposed on the bottle second portion outer surface. Still moreover, the method may include forming at least one grip aiding feature on an outer surface of the lid. Again still, the method may include forming the nestable bottle to be prescription medicine bottle.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
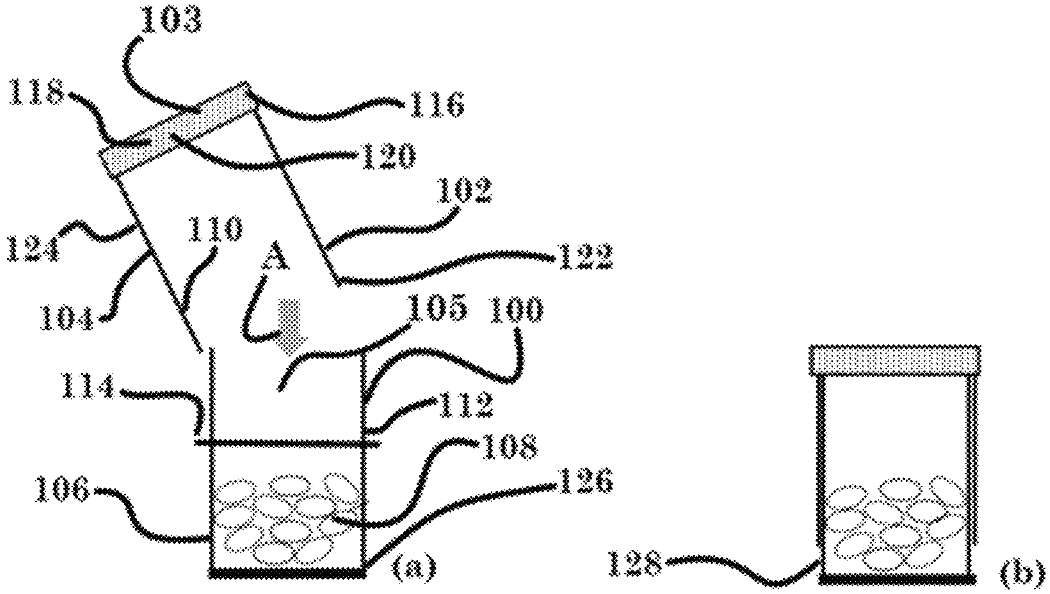
FIG. 1 shows a bottle of the current disclosure with: (a) a lid removed; and (b) the lid in place over the exterior of the bottle.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction “and” should not be read as requiring that each and every one of those items be present in the grouping, but rather should be read as “and/or” unless expressly stated otherwise. Similarly, a group of items linked with the conjunction “or” should not be read as requiring mutual exclusivity among that group, but rather should also be read as “and/or” unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as “one or more,” “at least,” “but not limited to” or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase “x to y” includes the range from ‘x’ to ‘y’ as well as the range greater than ‘x’ and less than ‘y’. The range can also be expressed as an upper limit, e.g. ‘about x, y, z, or less’ and should be interpreted to include the specific ranges of ‘about x’, ‘about y’, and ‘about z’ as well as the ranges of ‘less than x’, less than y’, and ‘less than z’. Likewise, the phrase ‘about x, y, z, or greater’ should be interpreted to include the specific ranges of ‘about x’, ‘about y’, and ‘about z’ as well as the ranges of ‘greater than x’, greater than y’, and ‘greater than z’. In addition, the phrase “about ‘x’ to ‘y’”, where ‘x’ and ‘y’ are numerical values, includes “about ‘x’ to about ‘y’”.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as “about” that particular value in addition to the value itself. For example, if the value “10” is disclosed, then “about 10” is also disclosed. Ranges can be expressed herein as from “about” one particular value, and/or to “about” another particular value. Similarly, when values are expressed as approximations, by use of the antecedent “about,” it will be understood that the particular value forms a further aspect. For example, if the value “about 10” is disclosed, then “10” is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of “about 0.1% to 5%” should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms “a”, “an”, and “the” include both singular and plural referents unless the context clearly dictates otherwise.

As used herein, “about,” “approximately,” “substantially,” and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms “about,” “approximate,” “at or about,” and “substantially” can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the disclosures herein can be presented as a combination kit. As used herein, the terms "combination kit" or "kit of parts" refers to the bottles and lids and any additional components that are used to package, sell, market, deliver, and/or provide the bottle and lid combination. Such additional components include, but are not limited to, packaging, syringes, blister packages, bottles, and the like. The separate kit components can be contained in a single package or in separate packages within the kit.

In some embodiments, the combination kit also includes instructions printed on or otherwise contained in a tangible medium of expression. The instructions can provide information regarding the bottle and lid and use of same.

Anyone with physical limitations, especially the elderly who might have arthritis, muscle coordination, strength, or other issues, has trouble unscrewing or snapping off a bottle cap. This is a critical problem for medicinal bottles where it is imperative for the person to have easy access to daily medicine. This disclosure describes a new kind of bottle, called the "Nestable," that does not require unscrewing or snapping to remove and replace the "lid." In one embodiment, a first cylindrical part slides into a second cylindrical part and maybe held together by frictional forces instead of screw threads or snapping fixtures. This makes access to medicines and other products easier and will improve the lives of millions of people.

FIG. 1 shows one embodiment of bottle 100 and lid 102 of the current disclosure. Lid 102 and bottle 100 may be made from plastics, synthetics, nonwovens, molded articles, ceramic, metal, etc. In a preferred embodiment, they are formed from medical grade plastic. While the FIGS. show bottle and lid as cylindrical in shape, the current disclosure should not be considered so limited as bottle 100 and lid 102 may be square, angular, elliptical, polygonal, etc. As FIG. 1 shows, a Nestable Bottle of the current disclosure may comprise a first portion 104 defining a lid 102 on outer surface 103 of first portion 104 and second portion 106 defining at least one open internal cavity 105 and bottle bottom 126. In this embodiment, first portion 104 (lid 102) may be sized to slide over and slide down second portion 106 (bottle 100), see arrow A. This configuration allows for securing contents 108 within bottle 100 via lid 102 as bottle 100 fits snugly, but easily, into lid 102. In the case of contents 108 needing sealed from air to prevent oxidation or to keep out moisture, sealant feature 114, such as wax or rubber seals, as known to those of skill in the art, 0-rings, etc., as known to those of skill in the art, may be added to either lid inner surface 110 of lid 102 or bottle outer surface 112 of bottle 100. Lid top 116 of lid 102 may be formed with frictional engagement features 118 around lid outer surface 120 to provide grip and purchase to the user. Thus, bottle 100 and lid 102 of the current disclosure require only a slight pulling upward action by the user to open bottle 100 and a slight downward pushing action is required to close bottle 100. When opening bottle 100, the pulling upward action causes lid 102 to slide up and off bottle 102 thereby exposing contents 108 of bottle 100 to the user. To close bottle 100, the user simply slips lid 102 back down over bottle 100. Engagement feature 118, such as grip tread, along lid top 116 facilitates holding by the user's fingers. In one embodiment, sides 122 and 124 of lid 102 do not reach or come all of the way to bottle bottom 126 creating grasp zone 128 on bottle 100 when lid 102 is fully engaged. This allows the user to grasp and hold bottle 100 while removing or replacing lid 102. Leaving the Nestable Bottle on a flat, solid surface while removing or replacing the top would be recommended.

Figure 2:
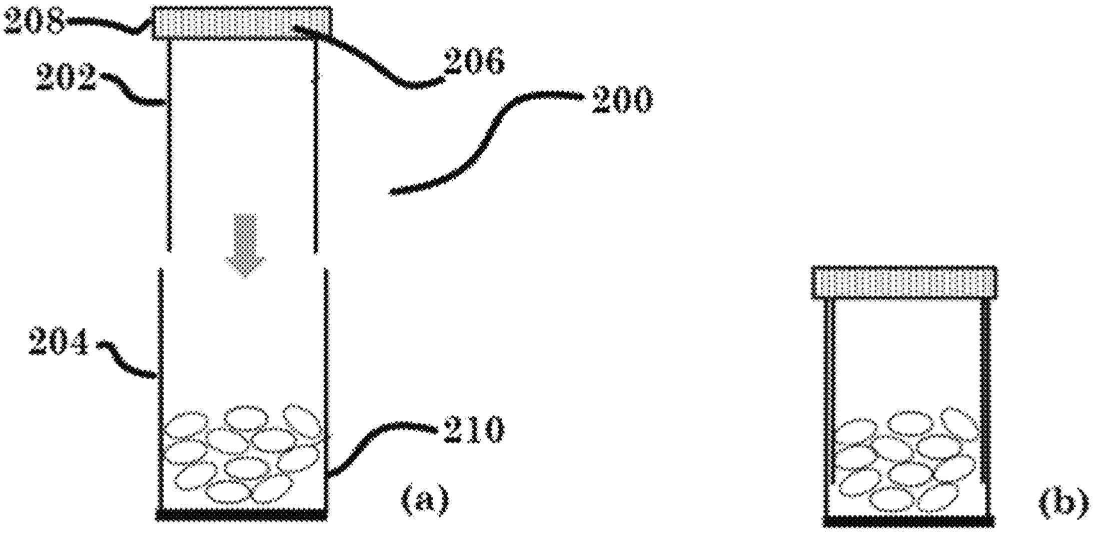
FIG. 2 shows an embodiment of the current disclosure wherein the bottle is configured so the lid inserts into the bottle body: (a) lid removed; and (b) lid inserted into the interior of the bottle: (a) lid removed; and (b) lid slides over an existing bottle.

FIG. 2 shows an alternate bottle configuration 200. Here, alternate lid 202 is configured to "nest" within alternate bottle 204, essentially the reverse bottle/lid configuration of FIG. 1. Only a slight pulling upward action is required by the user to open bottle 200 and a slight downward pushing action is required to close the pill bottle. Alternate engagement feature 206, which may be a grip tread, hum rubber, or other high friction surface, along the alternate lid top 208 facilitates holding by the user's fingers. In this variation, alternate bottle bottom 210 forms the "outside" of bottle 200 so the person holds alternate bottle 204 while pulling alternate lid 202 out or pushing it in. Here, too, leaving the Nestable Bottle on a flat, solid surface while removing or replacing the top would be recommended.

Figure 3:
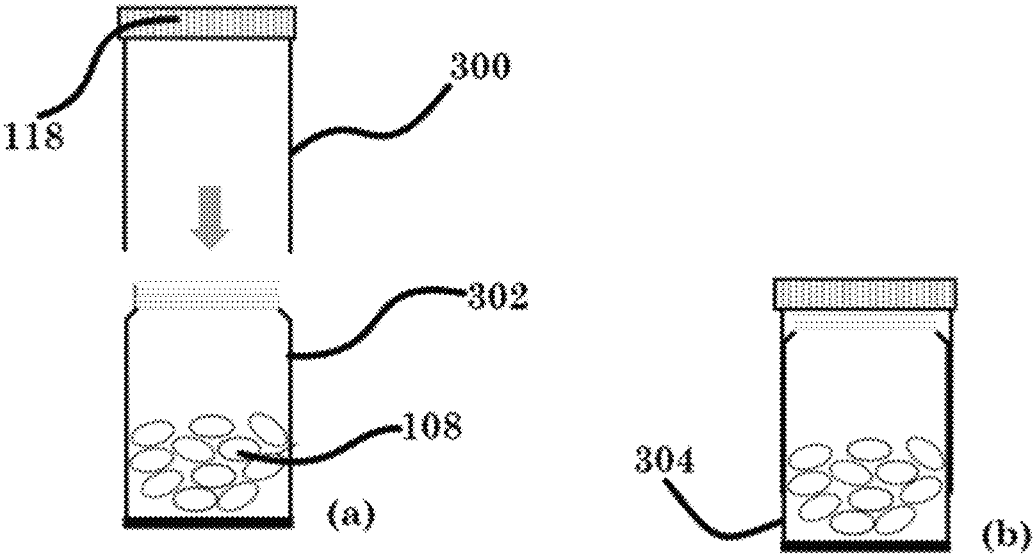
FIG. 3 shows an embodiment of the current disclosure wherein a lid fits over an existing threaded medicine bottle.

FIG. 3 shows a further embodiment of the current disclosure, outer nesting lid 300, which engages a preexisting bottle 302, such as a bottle a user receives from a pharmacy or doctor's office containing contents 108. As there are already billions of pill bottles currently in use by hundreds of millions of elderly or infirmed, instead of requiring all manufacturers and pharmacies to switch to the completely new Nestable Bottle as shown in FIGS. 1 and 2, FIG. 3 shows a "Nestable Top" that can be used with an existing pill bottle. As shown in FIG. 3, this idea involves only a "top," outer nesting lid 300, which fits snugly, but easily, onto any existing pill bottle 302, whether the pill body accommodates a threaded, screw or snap type lid. When opening existing pill bottle 302, the pulling upward action causes outer nesting lid 300 to slide up and off of the existing pill bottle 302, thereby exposing contents 108 of the bottle to the user. To close existing pill bottle 302, the user simply slips outer nesting lid 300 back onto existing pill bottle 302. Engagement feature 118, such as grip tread, incorporated onto outer nesting lid 300 facilitates holding by the user's fingers. Leaving the bottle on a flat, solid surface while removing or replacing the top would be recommended. The sides of outer nesting lid 300 do not reach to the bottom of existing pill bottle 302, thus, leaving an outer nesting lid grasping area 304 for holding existing pill bottle 302 for the user to grasp and hold while removing or replacing outer nesting lid 300.

Figure 4:
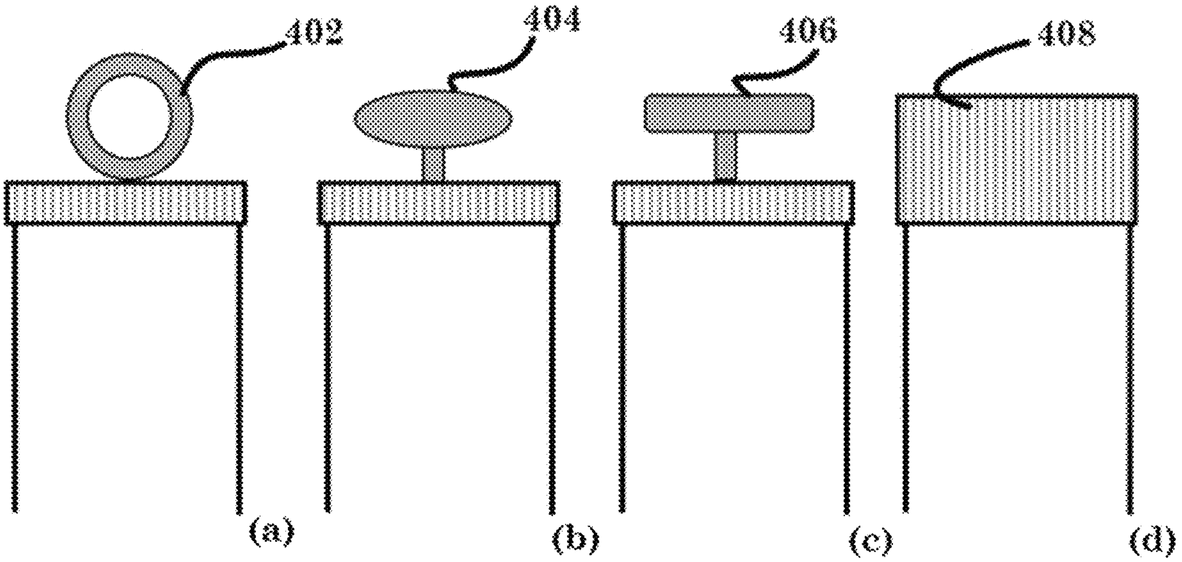
FIG. 4 shows variations of grip aids such as at: (a) a ring; (b) a knob; (c) a handle; and/or (d) an oversized lid, to provide easy grasp access for users.

As FIGS. 1-3 show engagement feature 118 and alternate engagement feature 206, which may be grip tread, microstructures, high friction surface areas, etc., as known to those of skill in the art associated with the lids of those embodiments. However, in a further embodiment, the tops may be designed to include one or more features to enhance the user's ability to grip the top and perform the required pulling and pushing action. FIG. 4 shows possible grip-aiding designs, but is not intended to be an exhaustive list of possible designs, such as ring 402, knob 404, handle 406, oversized grip feature 408, etc., all of which provide the user with better leverage to aid in removing the tops from their associated bottles. While suggested for use in the medicinal pill bottle industry, "Nestable" bottles and jars of general utility could be developed for a host of vertical industries to hold a multitude of goods such as jars to hold screws, nails, food items, powder containers, etc.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A nestable bottle comprising:

a bottle first portion defining a lid on an outer surface of the first bottle portion;

a bottle second portion defining at least one open internal cavity and a bottom of the nestable bottle;

the bottle first portion formed such that at least one inner surface of the bottle first portion engages over and slides down at least one outer surface of second bottle portion;

wherein the nestable bottle includes at least one sealant feature, wherein the at least one sealant feature is formed on at least one outer surface of the bottle second portion and is positioned between the at least one inner surface of the bottle first portion and the at least one outer surface of second bottle portion when bottle first portion slides over second bottle portion and the at least one sealant feature is substantially completely covered by the at least one inner surface of the bottle first portion.

2. The nestable bottle of claim 1, wherein the nestable bottle is configured to store contents or medicines within bottle second portion.

3. The nestable bottle of claim 1, wherein the bottle first portion includes at least one frictional engagement feature formed on an outer surface of the lid on the bottle first portion.

4. The nestable bottle of claim 1, wherein at least one second sealant feature is formed on at least one inner surface of the bottle first portion.

5. The nestable bottle of claim 1, wherein the at least one sealant feature is an O-ring, wax seal and/or rubber seal.

6. The nestable bottle of claim 1, wherein the bottle first portion when secured over the bottle second portion does not cover an entirety of bottle second portion outer surface and leaves at least one uncovered grasp zone exposed on bottle second portion outer surface.

7. The nestable bottle of claim 1, further comprising at least one grip aiding feature defined on an outer surface of the lid.

8. The nestable bottle of claim 1, wherein the nestable bottle comprises a prescription medicine bottle.

* * * * *